(12) United States Patent
Chen et al.

(10) Patent No.: US 7,995,033 B2
(45) Date of Patent: Aug. 9, 2011

(54) POWER SAVING DEVICE FOR DISPLAY

(75) Inventors: Ming-Ke Chen, Shenzhen (CN); Xiao-Zhu Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1046 days.

(21) Appl. No.: 11/829,098

(22) Filed: Jul. 27, 2007

(65) Prior Publication Data

US 2008/0170060 A1   Jul. 17, 2008

(30) Foreign Application Priority Data

Jan. 11, 2007  (CN) .......................... 2007 1 0200041

(51) Int. Cl.
*G09G 5/00* (2006.01)
(52) U.S. Cl. ........ 345/158; 345/204; 345/205; 345/206; 345/207; 345/208; 345/209; 345/210; 345/211; 345/212; 345/213; 345/214; 345/215; 345/76; 345/82; 345/87; 345/98; 315/169.1; 315/169.2; 315/169.3; 315/169.4
(58) Field of Classification Search ............... 345/76, 345/82, 87, 98, 204–215; 315/169.1–169.4
See application file for complete search history.

(56) References Cited

U.S. PATENT DOCUMENTS

| 5,918,060 | A | 6/1999 | Jeong | |
|---|---|---|---|---|
| 6,859,196 | B2 * | 2/2005 | Kehlstadt | 345/156 |
| 7,145,559 | B2 | 12/2006 | Yin | |
| 7,375,566 | B2 * | 5/2008 | Lin | 327/166 |
| 7,685,448 | B2 * | 3/2010 | Xu | 713/323 |

FOREIGN PATENT DOCUMENTS

CN    1215285 A    4/1999

\* cited by examiner

*Primary Examiner* — Richard Hjerpe
*Assistant Examiner* — Jeffrey S Steinberg
(74) *Attorney, Agent, or Firm* — Frank R. Niranjan

(57) ABSTRACT

A power saving device includes a first power connector adapted for connecting to a power source, a second power connector adapted for connecting to a power wire of a display, an infrared sensor, an infrared coupling circuit, a wave shaping circuit, and a switch circuit connected between the first and second power connectors. The infrared sensor senses user status and initiates a user status signal. The wave shaping circuit receives the user status signal via the infrared coupling circuit and converts the user status signal to a voltage signal. The switch circuit receives the voltage signal and converts the voltage signal to a control signal to control the connection between the first power connector and the second power connector.

9 Claims, 3 Drawing Sheets

POWER SAVING DEVICE FOR DISPLAY

BACKGROUND

1. Field of the Invention

The present invention relates to power saving devices, and particularly to a power saving device which can save on power used by displays.

2. Description of Related Art

Nowadays, displays such as liquid crystal displays (LCD) and cathode-ray tube (CRT) displays are widely used. Sometimes a user may leave a display turned on even though it is not in use, thereby wasting electricity.

What is desired, therefore, is to provide a power saving device to automatically control a power source of a display for saving electricity.

SUMMARY

An exemplary power saving device includes a first power connector adapted for connecting to a power source, a second power connector adapted for connecting to a power wire of a display, an infrared sensor, an infrared coupling circuit, a wave shaping circuit, and a switch circuit connected between the first and second power connectors. The infrared sensor senses user status and initiates a user status signal. The wave shaping circuit receives the user status signal via the infrared coupling circuit and converts the user status signal to a voltage signal. The switch circuit receives the voltage signal and converts the voltage signal to a control signal to control the connection between the first power connector and the second power connector.

Other advantages and novel features of the present invention will become more apparent from the following detailed description of an embodiment when taken in conjunction with the accompanying drawings, in which:

DETAILED DESCRIPTION

Figure 1:
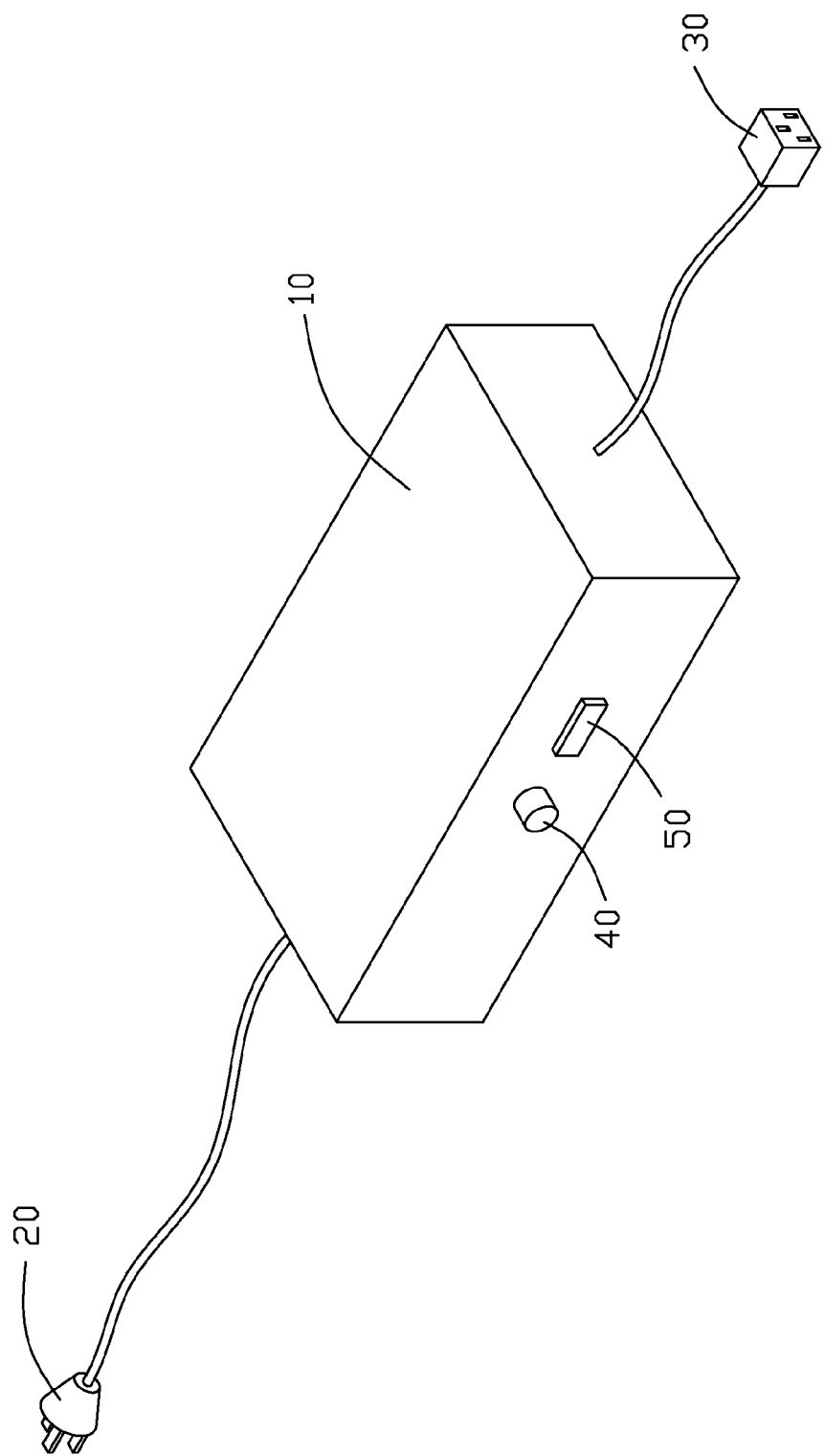
FIG. 1 is an isometric, schematic view of a power saving device in accordance with an embodiment of the present invention.

Referring to FIG. 1, a power saving device in accordance with an embodiment of the present invention is provided for controlling a power source of a display for saving power. The power saving device includes a case 10, a circuit board (not shown) installed in the case 10, a first power connector 20 adapted for connecting to a power source, a second power connector 30 adapted for connecting to a power wire of the display, a switch 40 such as a push-button switch, and an infrared sensor 50 such as a pyroelectric infrared sensor. The first power connector 20 is connected to the second power connector 30 via the circuit board in the case 10. The switch 40 and the infrared sensor 50 are mounted on an external wall of the case 10.

Figure 2:
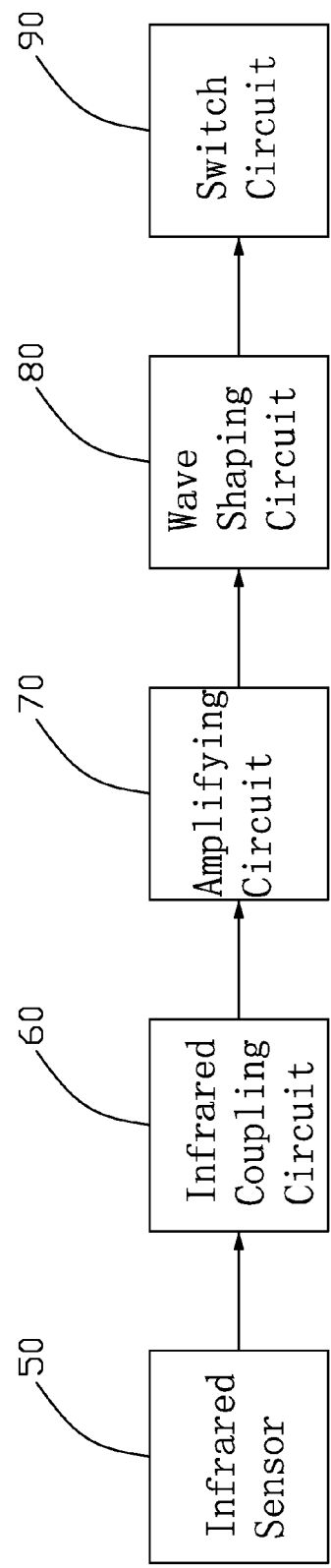
FIG. 2 is a block diagram of the power saving device of FIG. 1.
Figure 3:
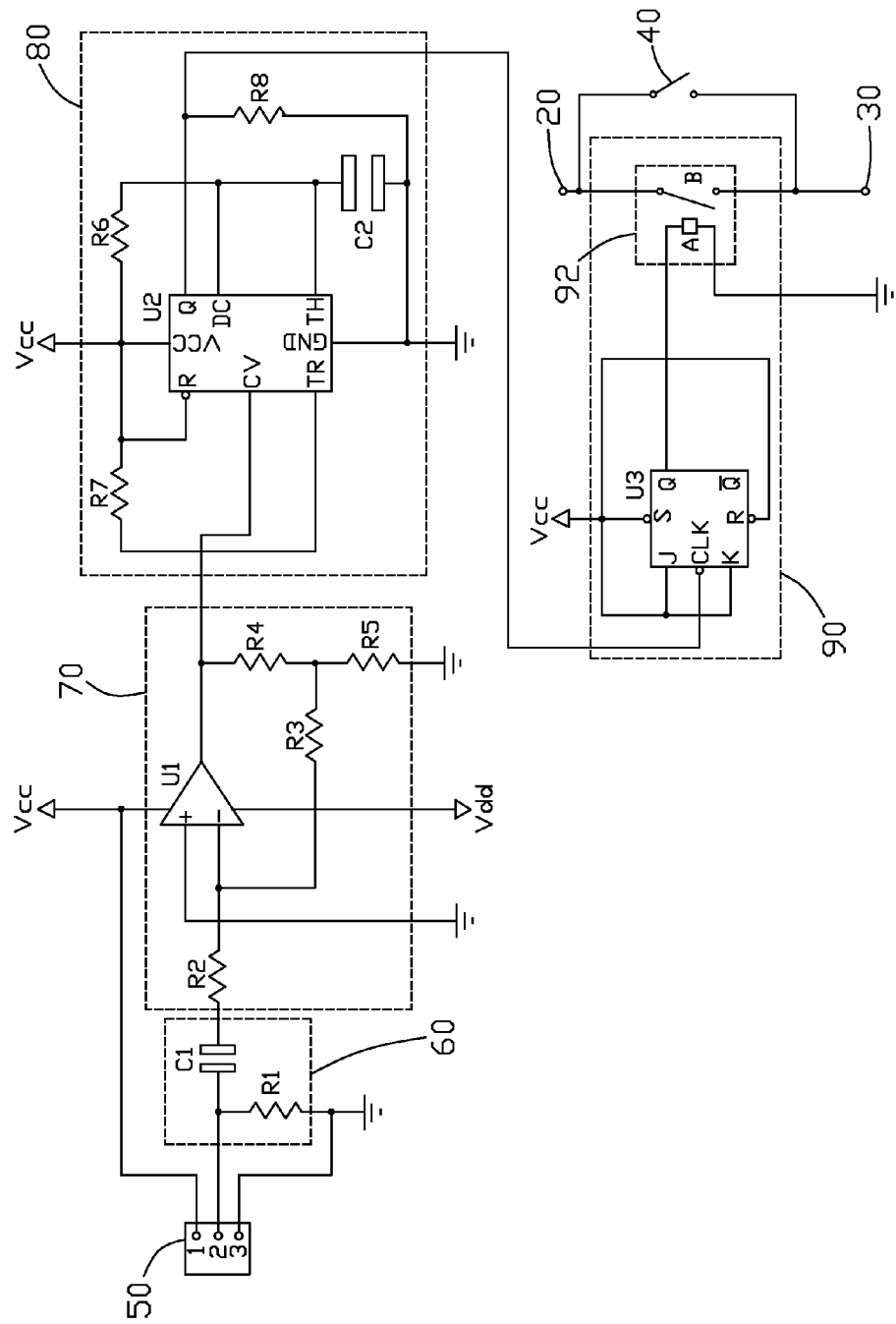
FIG. 3 is a circuit diagram of FIG. 2.

Referring also to FIGS. 2 and 3, the circuit board integrates an infrared coupling circuit 60, an amplifying circuit 70, a wave shaping circuit 80, and a switch circuit 90. The infrared sensor 50 is connected to an input of the amplifying circuit 70 via the infrared coupling circuit 60. The amplifying circuit 70 is used to amplify sensor signals from the infrared sensor 50. An output of the amplifying circuit 70 is connected to an input of the wave shaping circuit 80 adapted for receiving the amplified sensor signals and converting them to corresponding voltage signals. An output of the wave shaping circuit 80 is connected to an input of the switch circuit 90 adapted for receiving the voltage signals and outputting a control signal to control the connection between the first power connector 20 and the second power connector 30.

The infrared sensor 50 includes a power terminal 1 connected to a power source Vcc such as a 15V direct current power source, an output terminal 2, and a ground terminal 3. The infrared coupling circuit 60 includes a resistor R1 and a coupling capacitor C1. One end of the coupling capacitor C1 is connected to the output terminal 2 of the infrared sensor 50. The resistor R1 is connected between the output terminal 2 of the infrared sensor 50 and ground. The ground terminal 3 of the infrared sensor 50 is grounded. In this embodiment, the resistance of the resistor R1 is approximately 10 KΩ, and the capacitance of the capacitor C1 is approximately 100 μF.

The amplifying circuit 70 includes an amplifier U1, and four resistors R2, R3, R4, and R5. The amplifier U1 includes an inverting input terminal, a non-inverting input terminal, an output terminal, a cathode power terminal connected to the power source Vcc and an anode power terminal connected to another power source Vdd, such as a −15V direct current power source. The inverting input terminal of the amplifier U1 is connected to the other end of the capacitor C1 via the resistor R2. The non-inverting input terminal of the amplifier U1 is grounded. The output terminal of the amplifier U1 is connected to the resistors R4, R5, and ground in turn. A node between the resistors R4 and R5 is connected to the inverting input terminal of the amplifier U1 via the resistor R3. The gain of the amplifier U1 is set by the resistances of the selected resistors R2, R3, R4, and R5. In this embodiment, the resistances of the resistor R2, R3, R4, and R5 are approximately 10 KΩ, 1 MΩ, 9 KΩ, and 1 KΩ respectively.

The wave shaping circuit 80 includes a 555 timer U2, a capacitor C2, and three resistors R6, R7, and R8. The 555 timer U2 includes a control pin CV, a reset pin R, a trigger pin TR, a threshold pin TH, a power pin VCC, a ground pin GND, a discharge pin DC, and an output pin Q. The control pin CV is connected to the output terminal of the amplifier U1. The trigger pin TR is connected to the reset pin R via the resistor R7. The reset pin R and power pin VCC are connected to the power source Vcc. The discharge pin DC and threshold pin TH are connected to the power source Vcc via the resistor R6. The threshold pin TH is connected to the ground via the capacitor C2. The output pin Q is connected to the ground via the resistor R8. The ground pin GND is grounded. In this embodiment, the resistances of the resistor R6, R7, R8 are all approximately 10 KΩ, and the capacitance of the capacitor C2 is approximately 100 μF.

The switch circuit 90 includes a relay 92 having a coil A and a switch B, and a JK trigger U3 having—a clock signal input CLK, a set pin S, a reset pin R, two signal inputs J and K, and two signal outputs Q and Q. The set pin S, the reset pin R, and the signal inputs J and K of the JK trigger U3 are connected to the power source Vcc. The signal output Q of the JK trigger U3 is connected to ground via the coil A of the relay 92. The first power connector 20 is connected to the second power connector 30 via the switch B of the relay 92. The switch 40 is connected to the switch B of the relay 92 in parallel.

In other embodiments, the amplifying circuit 70 can be deleted as a cost saving measure. When the amplifying circuit 70 is deleted, the control pin CV of the 555 timer U2 is directly connected to the other end of the capacitor C1.

In use, the power wire connector of a display such as an LCD is connected to the second power connector 30 of the power saving device, and the first power connector 20 of the power saving device is connected to an external power source such as a 220V AC power source. The power saving device is placed near a user, the switch 40 is pushed to open it to allow the power saving device being workable. The infrared sensor 50 is aimed at an area where the user would be while using the display. When a user enters the area, the infrared sensor 50 generates a user returned signal and transmits the returned signal to the amplifying circuit 70 via the infrared coupling circuit 60. The returned signal is amplified by the amplifying circuit 70 and then received by the wave shaping circuit 80. The wave shaping circuit 80 converts the amplified returned signal to a voltage signal, and then transmits the voltage signal to the switch circuit 90. The switch circuit 90 converts the voltage signal to a control signal to control the relay 92, and then the switch B of the relay 92 is closed, so that the first power connector 20 is connected with the second power connector 30, thereby the display is turned on.

When the user leaves the area, the infrared sensor 50 senses the absence of the user and generates a user departed signal, and then transmits the departed signal to the amplifying circuit 70 via the infrared coupling circuit 60. The departed signal is amplified by the amplifying circuit 70 and then received by the wave shaping circuit 80. The wave shaping circuit 80 converts the amplified departed signal to a voltage signal, and then transmits the voltage signal to the switch circuit 90. The switch circuit 90 converts the voltage signal to a control signal to control the relay 92, and then the switch B of the relay 92 is opened, so that the first power connector 20 is cut off from the second power connector 30, thereby the display is shut down.

If the switch 40 is pushed again to close it to thereby disable the power saving device, the display will remain on even in the absence of a user.

In the use of the power saving device, when the user leaves the area monitored by the infrared sensor 50, the display will be automatically shut off by the power saving device thus saving electricity. In another embodiments, the power saving device can be assembled in the display for saving space.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power saving device adapted to automatically control a power source of a display for saving power, comprising:
    a first power connector adapted for connecting to a power source;
    a second power connector adapted for connecting to a power wire of the display;
    an infrared sensor for sensing user status and initiating a user status signal;
    an infrared coupling circuit connected to the infrared sensor;
    an amplifying circuit connected to the infrared coupling circuit for receiving the user status signal via the infrared coupling circuit and amplifying the user status signal;
    a wave shaping circuit connected to the amplifying circuit for receiving the amplified user status signal and converting the amplified user status signal to a voltage signal; and
    a switch circuit connected between the first power connector and the second power connector for receiving the voltage signal and converting the voltage signal to a control signal to control the connection between the first power connector and the second power connector;
    wherein the infrared coupling circuit comprises a first resistor and a coupling capacitor, an output terminal of the infrared sensor is connected to the amplifying circuit via the coupling capacitor, a ground terminal of the infrared sensor is grounded, the first resistor is connected between the output terminal and ground; and
    wherein the amplifying circuit includes an amplifier, a second resistor, a third resistor, a fourth resistor, and a fifth resistor, an inverting input terminal of the amplifier is connected to the infrared coupling circuit via the second resistor, a non-inverting input terminal of the amplifier is grounded, an output terminal of the amplifier is connected to the fourth resistor, fifth resistor, and ground in turn, a node between the fourth resistor and fifth resistor is connected to the inverting input terminal of the amplifier via the third resistor, the output terminal of the amplifier is also connected to the wave shaping circuit.

2. The power saving device as claimed in claim 1, wherein the infrared sensor is a pyroelectric infrared sensor.

3. The power saving device as claimed in claim 1, wherein the wave shaping circuit includes a 555 timer, a capacitor, a sixth resistor, a seventh resistor, and an eighth resistor, a control pin of the 555 timer is connected to the amplifying circuit, a trigger pin is connected to a reset pin of the 555 timer via the seventh resistor, the reset pin and a power pin of the 555 timer are connected to a power source, a discharge pin and a threshold pin of the 555 timer are connected to the power source via the sixth resistor, the threshold pin of the 555 timer is connected to ground via the capacitor, an output pin of the 555 timer is connected to ground via the eighth resistor and connected to the switch circuit.

4. The power saving device as claimed in claim 1, wherein the switch circuit includes a relay having a coil and a switch, and a JK trigger, a clock signal input of the JK trigger is connected to the wave shaping circuit, a set pin, a reset pin, signal inputs of the JK trigger are connected to a power source, a signal output of the JK trigger is connected to ground via the coil of the relay, the first power connector is connected to the second power connector via the switch of the relay, when the infrared sensor senses the absence of the user in the predetermined area, the switch of the relay is controlled to be open such that the second power connector is cut off from the first power connector to thereby shut off the display.

5. A power saving device configured to automatically control a power source of a display for saving power, comprising:
    a first power connector configured for connecting to a power source;
    a second power connector configured for connecting to a power wire of the display;
    an infrared sensor for sensing user status in a predetermined area near the display and initiating a user status signal;
    an infrared coupling circuit connected to the infrared sensor;
    a wave shaping circuit for receiving the user status signal via the infrared coupling circuit and converting the user status signal to a voltage signal; and a switch circuit connected between the first power connector and the second power connector for receiving the voltage signal and converting the voltage signal to a control signal to control the connection between the first power connector and the second power connector;

wherein the infrared coupling circuit comprises a resistor and a coupling capacitor, an output terminal of the infrared sensor is connected to the wave shaping circuit via the coupling capacitor, a ground terminal of the infrared sensor is grounded, the resistor is connected between the output terminal of the infrared sensor and ground; and wherein the switch circuit includes a relay having a coil and a switch, and a JK trigger, a clock signal input of the JK trigger is connected to the wave shaping circuit, a set pin, a reset pin, signal inputs of the JK trigger are connected to a power source, a signal output of the JK trigger is connected to ground via the coil of the relay, the first power connector is connected to the second power connector via the switch of the relay, when the infrared sensor senses the absence of the user in the predetermined area, the switch of the relay is controlled to be open such that the second power connector is cut off from the first power connector to thereby shut off the display.

6. The power saving device as claimed in claim 5, further comprising a switch connected in parallel to the switch of the relay.

7. The power saving device as claimed in claim 6, further comprising a case, the switch and infrared sensor are mounted on an external wall of the case.

8. The power saving device as claimed in claim 7, wherein the infrared coupling circuit, the wave shaping circuit, and the switch circuit are integrated on a circuit board arranged in the case.

9. A power saving device adapted to automatically control a power source of a display for saving power, comprising:

a first power connector adapted for connecting to a power source;

a second power connector adapted for connecting to a power wire of the display;

an infrared sensor for sensing user status and initiating a user status signal;

an infrared coupling circuit connected to the infrared sensor;

an amplifying circuit connected to the infrared coupling circuit for receiving the user status signal via the infrared coupling circuit and amplifying the user status signal;

a wave shaping circuit connected to the amplifying circuit for receiving the amplified user status signal and converting the amplified user status signal to a voltage signal; and a switch circuit connected between the first power connector and the second power connector for receiving the voltage signal and converting the voltage signal to a control signal to control the connection between the first power connector and the second power connector;

wherein the infrared coupling circuit comprises a first resistor and a coupling capacitor, an output terminal of the infrared sensor is connected to the amplifying circuit via the coupling capacitor, a ground terminal of the infrared sensor is grounded, the first resistor is connected between the output terminal and ground; and wherein the wave shaping circuit includes a 555 timer, a capacitor, a sixth resistor, a seventh resistor, and an eighth resistor, a control pin of the 555 timer is connected to the amplifying circuit, a trigger pin is connected to a reset pin of the 555 timer via the seventh resistor, the reset pin and a power pin of the 555 timer are connected to a power source, a discharge pin and a threshold pin of the 555 timer are connected to the power source via the sixth resistor, the threshold pin of the 555 timer is connected to ground via the capacitor, an output pin of the 555 timer is connected to ground via the eighth resistor and connected to the switch circuit.

* * * * *